United States Patent [19]

van Mal et al.

[11] 4,283,226

[45] Aug. 11, 1981

[54] METHOD OF PREPARING TITANIUM IRON-CONTAINING MATERIAL FOR HYDROGEN STORAGE

[75] Inventors: Harmannus H. van Mal; Hendrik A. van Esveld; Johannes S. van Wieringen; Kurt H. J. Buschow, all of Eindhoven, Netherlands

[73] Assignee: U.S. Philips Corporation, New York, N.Y.

[21] Appl. No.: 739,700

[22] Filed: Nov. 8, 1976

[30] Foreign Application Priority Data

Nov. 11, 1975 [NL] Netherlands ........................ 7513159

[51] Int. Cl.³ .................... C22C 30/00; C22C 22/00; C22C 38/12
[52] U.S. Cl. .................................... 75/175.5; 423/644
[58] Field of Search ............... 62/48; 75/134 F, 175.5; 252/471; 423/248, 644

[56] References Cited

U.S. PATENT DOCUMENTS

| | | | |
|---|---|---|---|
| 3,508,414 | 4/1970 | Wiswall et al. | 62/48 |
| 3,516,263 | 6/1970 | Wiswall et al. | 62/48 |
| 3,922,872 | 12/1975 | Reilly et al. | 62/48 |
| 4,111,689 | 9/1978 | Liu | 75/123 M |

OTHER PUBLICATIONS

Reilly et al., "Hydrogen Storage & Purification Systems II," BNL-19436, Aug. 1, 1974, pp. 1–4 and Figs. 3–10.

*Primary Examiner*—Upendra Roy
*Attorney, Agent, or Firm*—Marc D. Schechter

[57] ABSTRACT

A material for storing hydrogen consisting of a titanium-iron alloy having 5–30 at.% of one or more metals of the group chromium, zirconium, manganese and vanadium.

4 Claims, No Drawings

METHOD OF PREPARING TITANIUM IRON-CONTAINING MATERIAL FOR HYDROGEN STORAGE

BACKGROUND OF THE INVENTION

The invention relates to a material for storing hydrogen which contains titanium and iron in a mutual ratio in gram-atoms between 4:1 and 0.67:1. The invention further relates to the hydrides formed from such materials, to a method for storing and giving off hydrogen while using such materials and their hydrides, and to an apparatus containing such materials and their hydrides for storing and giving off hydrogen.

It is known that mixtures of iron and titanium in the form of compounds and alloys are suitable for storing hydrogen by forming hydrides under pressure at ambient temperature. By decreasing the pressure surrounding the material and/or heating the material, hydrogen is released from the material. U.S. Pat. No. 3,516,263 and U.S. Pat. No. 3,508,414 disclose a material which contains, by weight 35–75% Ti, the remaining percent being Fe. It appears that in practice an elaborate treatment of the material is necessary, after preparation, before the material can be made to quickly absorb and release hydrogen at ambient temperature.

This "activation treatment" may, for example, consist of heating the material to a temperature of 400° C. or higher in a vacuum and while continuously evacuating, followed by cooling the material to room temperature and supplying hydrogen to a pressure of approximately 35 atmospheres, whereafter the hydrogen is again released from the material by vacuum-pumping and heating. This procedure must be repeated various times to obtain such a degree of activation that at approximately 20° C. the material can reversibly absorb and release hydrogen at a sufficient speed which depends upon the pressure surrounding the material.

SUMMARY OF THE INVENTION

It is an object of the invention to provide a material which, compared with materials which exclusively contain titanium and iron can be activated in a simple manner at room temperature.

It is a further object of the invention to provide an apparatus and a method for storing and giving off hydrogen while using a material which, compared with materials which exclusively contain titanium and iron, can be activated in a simple manner at room temperature.

In accordance with this invention these objects are satisfied by a material which contains, besides titanium and iron in the said ratios one or more materials from the group comprising by chromium, zirconium, manganese and vanadium.

Preferably, the composition of the material in gram-atoms is, based on the total material, 5 to 30% of one or more of the elements of the group comprising the metals chromium, zirconium, manganese and vanadium. The remainder of the material is titanium and iron in the specified mutual ratio.

The presence of these metals in the material results, in many cases, in the same quantity of hydrogen being absorbed at a lower hydrogen pressure as compared with materials which contain titanium and iron, only while the total capacity of absorption, in ml of hydrogen per gram of material, is in general of the same order of magnitude as with materials which contain titanium and iron only. This has the advantage that the reservoirs may be simpler in construction, as they need only be able to withstand relatively lower pressures. Furthermore, there is a greater freedom of choice so that it is possible for a given application to utilize a material having the most favorable properties as regards hydrogen absorption. For energy storage by means of hydrogen absorption, in which one wants to permit hydrogen pressures to a maximum of 2 atmospheres at approximately 20° C. in a simple apparatus, a material which contains, Ti and Fe in a mutual ratio of between 2.5:1 and 1.1:1 and Mn in a quantity of 5 to 30 atom % based on the total material has appeared particularly suitable. An example of such a material is $TiFe_{0.8}Mn_{0.2}$.

The materials according to the invention are prepared by fusing the composite metals in the proper ratio by means of arc melting in a non-oxidizing, for example neutral or reducing, atmosphere or in vacuo and by cooling the casting down to room temperature. If desired the casting may now be pulverized. Activating can now be done in a simple manner at approximately 20° C. by exposing the material to hydrogen with a pressure of 30 to 40 atmospheres. Usually the material reaches its maximum capacity after only one cycle of loading with hydrogen and a subsequent release of hydrogen.

BRIEF DESCRIPTION OF THE DRAWINGS

The sole FIGURE is a diagrammatic and partly cross-sectional view of an apparatus for storing hydrogen while using the materials according to the invention.

DESCRIPTION OF THE PREFERRED EMBODIMENTS

By fusing the relevant elements in the required quantities (namely Ti and Fe in a mutual ratio in gram-atoms of from 4:1 to 0.67:1, and one or more of Cr, Zr, Mn, and V in a quantity of 5–30 atom % of the total material) casting were produced having compositions which may be indicated by the following formulae.

| | |
|---|---|
| 1. $TiFe_{0.9}Cr_{0.1}$ | 7. $TiFe_{0.4}Mn_{0.6}$ |
| 2. $TiFe_{0.8}Cr_{0.2}$ | 8. $TiFe_{0.9}V_{0.1}$ |
| 3. $TiFe_{0.7}Cr_{0.3}$ | 9. $TiFe_{0.8}V_{0.2}$ |
| 4. $TiFe_{0.9}Zr_{0.1}$ | 10. $Ti_{0.9}FeZr_{0.1}$ |
| 5. $TiFe_{0.9}Zr_{0.2}$ | 11. $Ti_{0.8}Zr_{0.2}Fe$ |
| 6. $TiFe_{0.8}Mn_{0.2}$ | |

The materials indicated by the compositions 1 to 11 were activated by exposing them, at a temperature of 20° C., to hydrogen having a pressure of 30 atmospheres until hydrogen was no longer absorbed. Thereafter, hydrogen was removed from the materials while measuring the quantity of absorbed hydrogen. After this activation treatment was completed, an equilibrium was obtained in all cases within a few minutes further on exposure to a hydrogen atmosphere. The table below specifies for the above-mentioned compounds the activation time and the absorption capacity in ml of hydrogen per gram of material at 20° C.

TABLE

| Example | Composition | Activation time (1) | Absorption capacity (2) in ml/gr. |
|---|---|---|---|
| 1 | $TiFe_{0.9}Cr_{0.1}$ | + | 225 |
| 2 | $TiFe_{0.8}Cr_{0.2}$ | ++ | 223 |

TABLE-continued

| Example | Composition | Activation time (1) | Absorption capacity (2) in ml/gr. |
|---|---|---|---|
| 3. | $TiFe_{0.7}Cr_{0.3}$ | +++ | 229 |
| 4 | $TiFe_{0.9}Zr_{0.1}$ | +++ | 241 |
| 5 | $TiFe_{0.8}Zr_{0.2}$ | ++++ | 270 |
| 6 | $TiFe_{0.8}Mn_{0.2}$ | ++ | 190 |
| 7 | $TiFe_{0.4}Mn_{0.6}$ | +++ | 230 |
| 8 | $TiFe_{0.9}V_{0.1}$ | ++ | 242 |
| 9 | $TiFe_{0.8}V_{0.2}$ | ++++ | 273 |
| 10 | $Ti_{0.9}FeZr_{0.1}$ | +++ | 242 |
| 11 | $Ti_{0.8}FeZr_{0.2}$ | +++ | 217 |
| A | TiFe | --- | 230 |

(1) − more than 24 hours
+ within 10 hours
++ within 5 hours
+++ within 60 minutes
++++ within 5 minutes
(2) at a hydrogen pressure of 30 atm and at 20° C.

The invention will be further explained with reference to the drawing, the only FIGURE of which shows diagrammatically and partly in cross-section an apparatus for storing hydrogen while using the materials according to the invention. In the FIGURE there is a reservoir 1 for the material 2 provided with a pressure gauge 5. A supply and discharge pipe 6 is provided with a controllable shut-off valve 4 for the hydrogen. A heating device 3 is wound around the reservoir 1.

Loading the material 2 with hydrogen is effectuated by pumping hydrogen, after the reservoir 1 has been evacuated, into the reservoir 1 until the pressure in the reservoir 1 rises to above the equilibrium pressure of the material 2. The hydrogen can be released from the material 2 by reducing the hydrogen pressure above the material 2 the below the equilibrium pressure or by increasing the temperature of the material 2 to above ambient temperature.

An advantage of the materials according to the invention is, that the equilibrium pressure at a given temperature is generally lower as compared to materials which contain only Ti and Fe, so that the reservoirs need not be designed for relatively high pressure and the reservoirs need not be exposed to high temperatures when activating the material.

What is claimed is:

1. A method of preparing a material for storing hydrogen, comprising the steps of:

fusing titanium and iron, in a mutual ratio in gram-atoms of between 4:1 and 0.67:1, in combination with 5–30 atom % of at least one metal selected from the group consisting of chromium, zirconium and vanadium; and activating the material obtained by exposing it to a hydrogen atmosphere at ambient temperature.

2. A method as claimed in claim 1, wherein the material is activated by exposing it to a hydrogen atmosphere with a pressure of 30–40 atmospheres.

3. A method as claimed in claim 2, wherein the material is activated at a temperature of approximately 20° C.

4. A method as claimed in claim 3 wherein the material is activated by exposing it only once to a hydrogen atmosphere for a maximum time of approximately 5 minutes.

* * * * *